March 3, 1964 G. N. JOHNSON 3,123,271

TAPE DRIVE MECHANISM

Original Filed Aug. 3, 1959

INVENTOR:
George N. Johnson

By Smyth & Roston

Attorneys, 3,123,271
Patented Mar. 3, 1964

1

3,123,271

TAPE DRIVE MECHANISM

George N. Johnson, Tujunga, Calif., assignor to Minnesota Mining and Manufacturing Company, St. Paul, Minn., a corporation of Delaware Continuation of application Ser. No. 831,106, Aug. 3, 1959. This application Nov. 26, 1962, Ser. No. 241,102
11 Claims. (Cl. 226—186)

Figure 1:
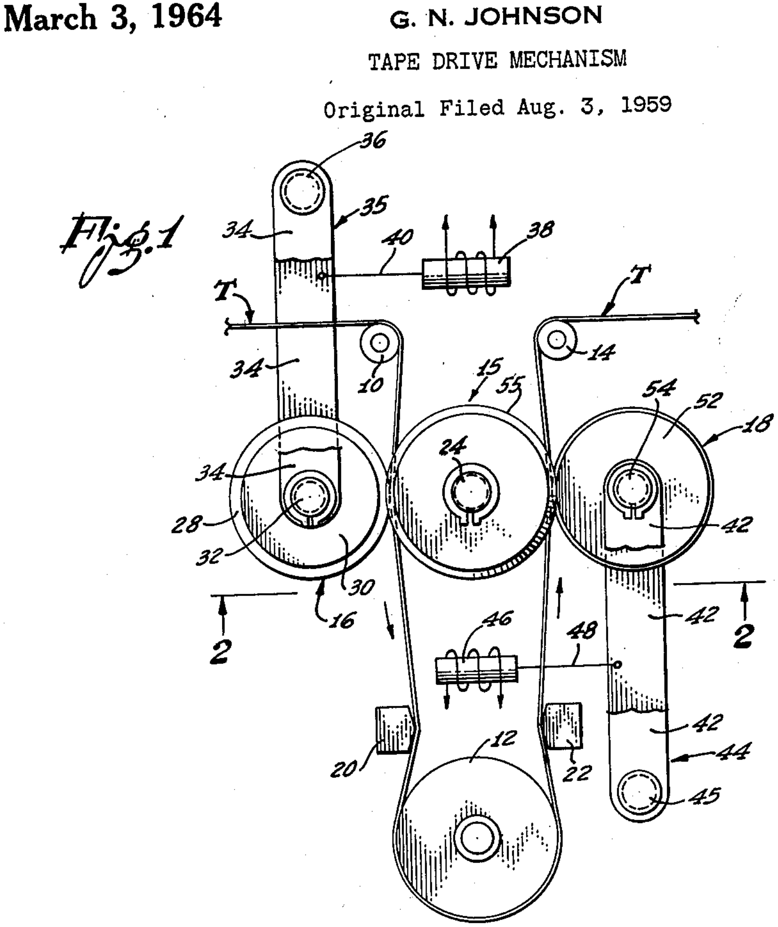

This invention relates to a mechanism for driving a tape with a portion of the tape under tension. More particularly, the invention refers to that type of mechanism in which the desired tension is created by forming the tape into a loop and pressing the two sides of the loop against a power actuated capstan by two nip-rollers in a manner to produce a differential driving effect.

This application is a continuation of my copending application Serial Number 831,106, filed August 3, 1959, for Tape Drive Mechanism.

While the invention is widely applicable for its purpose to drive various kinds of ribbon-like members, it has been initially embodied in a mechanism for driving magnetic tape for recording and reproducing television programs. Such an embodiment of the invention has been selected for the present disclosure and will provide adequate guidance for those skilled in the art who may have occasion to apply the same principles to other specific purposes.

In a typical tape recording and reproducing system, the tape is taken from a pay-out reel to form the tensioned loop at a pair of transducing stations and the tape from the loop is delivered to a second take-up reel. For television recording and reproducing, a very large amount of information must be transmitted each second and to keep the length of a program tape within a practical limit, the information must be distributed not only longitudinally of the tape but also transversely. Even with such compact transverse recording, high rates of tape travel are necessary.

Precise control of the moving tape is mandatory with the travel of the tape past a reproducing transducer exactly duplicating the previous travel of the tape past the recording transducer. Even exceedingly minute fluctuations in the rate of tape travel result in distortion of the signals by frequency modulation and the slightest departure of the tape from the predetermined path of travel causes serious signal distortion by phase displacement.

Precise control of even a moderate quantity of narrow tape at moderate rates of travel is difficult because both the pay-out reel and the take-up reel place the tape under tension and thereby create irregularities in tape travel which tend to be transmitted to the tensioned loop. The difficulties multiply in television recording both because of the greatly increased rate of tape travel and because the greater bulk of tape makes the fully loaded reels heavy. In addition, troublesome degrees of eccentricity of the heavily wound reels are inevitable.

The higher speeds of television recording also make it more difficult to maintain constant tension and constant rate of travel in the loop of tape at the transducing stations. To place the loop under tension, there must be a drive differential, the ingoing tape being driven at one speed and the outgoing tape being driven at a slightly higher speed with consequent elongation of the portion of tape that forms the loop. The means for placing the loop of tape under tension must isolate all irregularities of tape travel originating at the reels outside the loop and must maintain constant tension in the loop. Any fluctuation in the degree to which the tape is elongated results in frequency modulation of the signals.

The greatest difficulty is to elongate the loop portion

2 of the traveling tape without creating skewing forces with serious effects on the signals. This difficulty may be appreciated when it is considered that tape for television recording is relatively wide and that substantial changes in tension occur at both boundaries of the elongation zone. To avoid skewing, the transition in tension must be uniform across the relatively wide tape at both of the two boundaries of the elongation zone.

The present invention meets this situation by a basic combination of a drive capstan and two cooperative nip-rollers but does so with new relationships and with a new mode of operation.

The drive capstan has a smooth hard cylindrical surface of uniform configuration for contact with the full width of the traveling tape and both nip-rollers have uniform cylindrical surfaces of rubber-like material to press the tape against the smooth hard surface of the capstan. The ingoing nip-roller has complete freedom for rotation and therefore tends to make the ingoing tape travel at the same rate as the periphery of the drive capstan. The second nip-roller, however, is power actuated to rotate at a peripheral speed slightly higher than the peripheral speed of the drive capstan and, therefore, creates a tendency for the outgoing tape to travel faster than the peripheral speed of the drive capstan. These two tendencies created at the ingoing and outgoing nip-rollers conflict and result in a certain stable equilibrium with slippage occurring at the point of contact of the outgoing tape with the drive capstan and with the tape correspondingly elongated between the two nip-rollers.

Successful operation in this manner requires a constant speed differential between the drive capstan and the outgoing nip-roller and this constant speed differential may best be attained by using the drive capstan itself to drive the outgoing nip-roller by means of some suitable intervening speed-increasing transmission. Various types of transmission arrangements may be used for this purpose, including gear trains.

A feature of the present embodiment of the invention is the concept of simply placing at least one end portion of the drive capstan in driving engagement with a corresponding end portion of the outgoing nip-roller to create the desired speed differential. Preferably two opposite end portions of the drive capstan are in frictional driving engagement with two opposite end portions of the nip-roller for this purpose.

Avoidance of any tendency for the creation of skew is achieved by the application of uniform pressure across the full width of the tape by both nip-rollers, the tape being pressed uniformly against a hard smooth uniform capstan surface at each boundary of the elongation zone. Also important is the balancing of the transmission forces at the outgoing nip-roller by providing driving engagement at both ends of the nip-roller.

The features and advantages of the invention may be understood from the following detailed description considered with the accompanying drawing.

Figure 2:
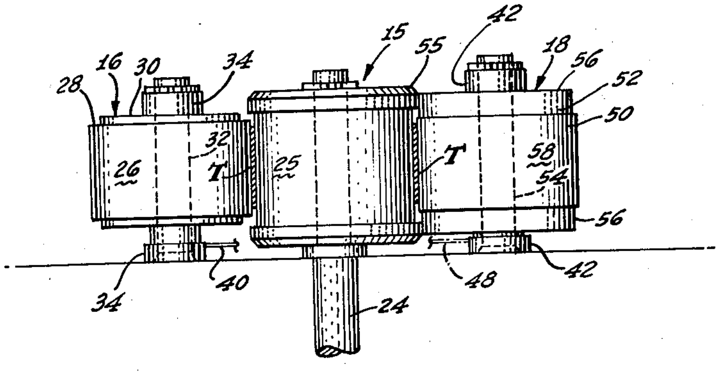

In the drawing, which is to be regarded as merely illustrative:

FIG. 1 is a diagrammatic plan view of the selected embodiment of the invention; and FIG. 2 is an elevation of the capstan and the two associated nip-rollers as seen along the line 2—2 of FIG. 1.

The drawing shows a traveling magnetic tape, generally designated T, which is unwound from a conventional pay-out reel (not shown) and which makes a 90° turn around a smooth polished guide post 10. The traveling tape makes a 180° turn around a reversing guide roller 12 and then makes a 90° turn around a second polished guide post 14 to be wound upon a conventional take-no reel (not shown). The traveling tape between the first guide post 10 and the reversing guide roller 12 is pressed against one side of a drive capstan 15 by an ingoing nip-roller 16 and the tape returning from the reversing guide roller to the second guide post 14 is held under pressure against the other side of the drive capstan by a second outgoing nip-roller 18.

This arrangement forms a portion of the tape into a loop around the reversing guide roller 12 and places this loop portion under tension for recording or reproducing signals by suitable transducer means. The drawing shows a recording head 20 in contact with the ingoing leg of the loop and a reproducer or play-back head 22 in contact with the outgoing leg of the loop.

In accord with the teaching of the invention, the capstan 15, which is mounted on a power driven spindle 24, has a solid cylindrical body presenting a solid unyielding cylindrical surface 25 that is at least as wide as the tape T, and preferably is somewhat wider. The body of the capstan 15 may be made of suitable metal and preferably the cylindrical surface 25 is polished.

The ingoing nip-roller 16 has a cylindrical peripheral surface 26 which is of yielding character and is made of rubber-like material. In the construction shown, the yielding surface 26 is provided by mounting a cylindrical rubber sleeve 28 on a solid cylindrical metal core 30. The width or axial dimension of the cylindrical peripheral surface 26 is at least as wide as the tape T and is preferably slightly wider.

Any suitable arrangement may be provided for mounting the ingoing nip-roller 16 in a manner to cooperate with the capstan 15 in the required manner. For this purpose, a well-known arrangement may be employed in which the nip-roller 16 is mounted on an axle 32 that is carried by parallel arms 34 of a bracket 35. The bracket 35 is mounted on a pivot stud 36 to permit the ingoing nip-roller 16 to swing in an arc towards and away from the capstan 15. When the tape transport mechanism is in operation, the ingoing nip-roller 16 is urged against the capstan 15 with the required pressure by means of a solenoid 38. The solenoid 38 is shown diagrammatically and is operatively connected to the bracket 35 by means 40. When the solenoid 38 is deenergized, the bracket 35 is biased away from the capstan 15 by the usual spring means (not shown) incorporated in the solenoid construction.

When the solenoid 38 is energized to urge the ingoing nip-roller 16 against the capstan 15, the rubber-like surface of the nip-roller is slightly deformed by the pressural contact. The pressural contact causes the interposed tape to tend to travel at the peripheral speed of the capstan 15, the nip-roller rotating at substantially the same peripheral speed.

The outgoing nip-roller 18 may be mounted in the same manner on parallel arms 42 of a bracket 44 that is mounted on a pivot stud 45. The bracket 44 is controlled by a second solenoid 46 that is operatively connected thereto by means 48. Thus when both solenoids 38 and 46 are energized, the two legs of the tape loop are pressed against the opposite sides of the capstan 15 by the corresponding nip-rollers.

The outgoing nip-roller 18, like the ingoing nip-roller, may comprise a sleeve 50 of rubber-like material at least as wide as the tape embracing a solid metal cylindrical core 52. The core 52 is rotatably mounted on an axle 54 carried by the bracket 44.

As heretofore stated, since the speed differential existing between the periphery of the outgoing nip-roller 18 and the periphery of the capstan 15 must be constant, it is advantageous to drive the outgoing nip-roller by means of the capstan and any suitable transmission means may be employed for this purpose. In this embodiment of the invention, the drive capstan 15 has two opposite concentric end portions 55 which are, respectively, in peripheral driving engagement with corresponding concentric end portions 56 of the outgoing nip-roller 18, the end portions 56 being unitary with the previously mentioned solid core 52. In the construction shown in the drawing, the end portions 55 of the capstan make frictional driving engagement with the end portions 56 of the outgoing nip-roller 18, the metal of the end portions having roughened peripheral surfaces for this purpose. Such roughened metal surfaces have a relatively high coefficient of friction with respect to each other, the coefficient of friction being greater than the coefficient of friction of the smooth metal surface 25 of the drive capstan 15 with respect to the tape T. Thus the end portions 55 of the drive capstan and the corresponding end portions 56 of the outgoing nip-roller function in the manner of intermeshed gears.

It is apparent that the peripheral speed of the cylindrical surface 58 of the outgoing nip-roller 18 relative to the peripheral speed of the cylindrical surface 25 of the drive capstan 15 depends upon the product of three ratios, namely, the ratio of the diameter of the end portions 55 of the drive capstan to the diameter of the cylindrical surface 25 of the capstan, the ratio of the diameter of the end portions 55 of the drive capstan to the diameter of the end portions 56 of the second nip-roller 18 and the ratio of the diameter of the cylindrical portion 58 of the second nip-roller to the diameter of the end portions 56 of the second nip-roller. With this product greater than unity, the peripheral speed of the second nip-roller 18 is correspondingly greater than the peripheral speed of the cylindrical surface 25 of the drive capstan.

In the present embodiment of the invention, the required increase in the peripheral speed of the outgoing nip-roller 18 over the peripheral speed of the drive capstan is provided both by making the diameter of the end portions 55 of the capstan greater than the diameter of the cylindrical surface 25 of the capstan and by making the diameter of the cylindrical portion 58 of the nip-roller greater than the diameter of the end portions 56 of the nip-roller, the diameter of the end portions 55 of the capstan and the diameter of the end portions 56 of the nip-roller being equal. Other diameter relationships may be employed, however, for the same purpose.

The effect of driving the outgoing nip-roller 18 at greater peripheral speed than the drive capstan 15 is to cause slippage of the traveling tape with respect to the smooth cylindrical surface 25 of the drive capstan at both the ingoing leg and the outgoing leg of the tape loop. With such slippage, there is equilibrium between the tendency of the ingoing nip-roller 16 to cause the tape to travel at exactly the peripheral speed of the drive capstan 15 and the tendency of the faster outgoing nip-roller 18 to cause the tape to travel faster than the peripheral speed of the drive capstan. By virtue of this equilibrium, the ingoing tape travels slightly faster than the peripheral speed of the drive capstan and the outgoing tape travels even faster.

In a typical practice of the invention, the increase in the rate of rotation of the outgoing nip-roller 18 relative to the rate of rotation of the drive capstan 15 is selected to create an equilibrium at which the outgoing tape at the outgoing nip-roller 18 travels approximately 0.02% faster than the ingoing tape at the ingoing nip-roller 16. The tape of the loop is correspondingly elongated approximately 0.02% to place the tape under corresponding tension.

My description in specific detail of the selected embodiment of the invention will suggest various changes, substitutions and other departures from my disclosure within the spirit and scope of the appended claims.

I claim:

1. In a transporting mechanism for a tape having a particular width, the combination of:

a drive capstan having first, second and third cylindrical portions and having the second cylindrical portion between the first and third cylindrical portions and having a first diameter for the second cylindrical portion and having a second diameter for the first and third cylindrical portions, the axial dimension of the second cylindrical portion on the capstan being at least as great as the width of the tape to provide a disposition of the tape against the second cylindrical portion of the capstan, means operatively coupled to the drive capstan for rotating the capstan at a particular speed, and a nip-roller having first, second and third cylindrical portions and having the second cylindrical portion between the first and third cylindrical portions and having a third diameter for the second cylindrical portion and having a fourth diameter for the first and third cylindrical portions, the second cylindrical portion of the nip-roller being disposed adjacent to the second cylindrical portion of the capstan and being provided with an axial dimension at least as great as the width of the tape, the first and third cylindrical portions of the nip-roller being disposed against the first and third cylindrical portions of the capstan to obtain a driving of the nip-roller by the capstan, the first, second, third and fourth diameters having relative values to obtain a greater speed for the nip-roller at the second cylindrical portion of the nip-roller than the particular speed at which the capstan is driven such that a controlled tension is produced in the tape.

2. The combination set forth in claim 1 in which the first and third cylindrical portions of the drive capstan are constructed to provide a greater coefficient of friction than the second portion of the drive capstan to facilitate a driving of the nip-roller by the capstan and a slippage of the tape on the capstan.

3. In a transporting mechanism for a tape having a particular width, the combination of:

a drive capstan having first and second cylindrical portions, the second cylindrical portion having an axial dimension greater than the particular width of the tape, and a nip-roller having first and second cylindrical portions, the second cylindrical portion on the nip-roller having an axial dimension greater than the particular width of the tape, the first cylindrical portion on the drive capstan engaging the first cylindrical portion on the nip-roller to obtain a driving of the nip-roller by the drive capstan and the second cylindrical portion on the nip-roller being disposed relative to the second cylindrical portion on the drive capstan to provide a disposition of the tape between the second cylindrical portions on the drive capstan and the nip-roller, the product of the ratio of the diameters of the first and second cylindrical portions on the drive capstan and the ratio of the diameters of the first cylindrical portions on the drive capstan and the nip-roller and the ratio of the diameters of the second and first cylindrical portions on the nip-roller being greater than one to obtain a tensioning of the tape and a slippage of the tape in its drive by the capstan and the nip-roller.

4. The combination set forth in claim 3 in which the nip-roller is provided with a rubber-like surface and is pressed against the drive capstan and in which means are operatively coupled to the drive capstan to drive the drive capstan.

5. The combination set forth in claim 3 in which the nip-roller is provided with a rubber-like surface and in which the first cylindrical portion of the drive capstan is provided with a greater coefficient of friction than the second cylindrical portion of the capstan to obtain a driving of the nip-roller by the capstan and to obtain a slippage of the tape on the capstan.

6. In a transporting mechanism for a tape having a particular width, the combination of:

a drive capstan having first, second and third portions, the second portion on the drive capstan being disposed between the first and third portions and being provided in a first direction with a dimension greater than the particular width of the tape to receive the tape, the first and third portions having in a second direction substantially equal dimensions transverse to the first direction, a first nip-roller disposed relative to the drive capstan to press the tape against the second portion of the drive capstan and to obtain a driving of the nip-roller by the capstan, a second nip-roller having first, second and third portions, the second portion on the second nip-roller being disposed between the first and third portions on the second nip-roller and being provided in the first direction with a dimension greater than the particular width of the tape, the first and third portions on the second nip-roller having substantially equal dimensions in the second direction, the second portion on the second nip-roller being aligned in the first direction with the second portion on the first nip-roller to obtain a disposition of the tape between the second portions on the drive capstan and the second nip-roller and against the second portion on the first nip-roller, the first and third portions on the second nip-roller being respectively disposed against the first and third portions on the drive capstan to obtain a driving of the second nip-roller by the capstan, the first nip-roller and the first, second and third portions on the drive capstan and on the second nip-roller having relative dimensions in the second direction to obtain a driving of the first nip-roller and second portion of the second nip-roller at a slightly greater speed than the capstan and to obtain a movement of the second portion of the second nip-roller at a slightly greater speed than the first nip-roller for a tensioning of the tape at the second nip-roller.

7. The combination set forth in claim 6 in which means are operatively coupled to the capstan to drive the capstan and in which the dimension in the second direction of the first and third portions on the capstan is greater than the dimension in the second direction of the second portion on the capstan and in which the dimension in the second direction of the second portion on the second nip-roller is greater than the dimension in the second direction of the first and third portions on the second nip-roller.

8. The combination set forth in claim 7 in which the first and second nip-rollers are provided with rubber-like surfaces.

9. In a transporting mechanism for a tape having a particular width, the combination of:

a drive capstan having first, second and third cylindrical portions and having a first diameter for the first and third cylindrical portions and having a second diameter for the second cylindrical portion, the second cylindrical portion being disposed between the first and third cylindrical portions and being provided with an axial dimension at least equal to the particular width of the tape to provide a disposition of the tape on the second cylindrical portion of the drive capstan, a first nip-roller having an annular configuration and disposed in pressure contact against the second cylindrical portion of the drive capstan, and a second nip-roller having first, second and third cylindrical portions and having a third diameter for the first and third cylindrical portions and having a fourth diameter for the second cylindrical portion; the second cylindrical portion on the second nip-roller being disposed between the first and third cylindrical portions on the second nip-roller and being provided with an axial dimension at least equal to the particular width of the tape, the first and third cylindrical portions of the nip-roller being disposed in pressure contact respectively against the first and third cylindrical portions of the drive capstan, the first, second, third and fourth diameters being provided with values for obtaining a product greater than one for the ratio of the first and second diameters, the ratio of the first diameters on the drive capstan and the third diameters of the second nip-roller and the ratio of the fourth and third diameters on the second nip-roller to provide a greater peripheral speed for the second cylindrical portion on the nip-roller than for the second cylindrical portion on the drive capstan and to provide for a slippage of the tape at the second nip-roller.

10. The combination set forth in claim 9 in which the first and third cylindrical portions of the drive capstan are provided with a greater coefficient of friction than the second cylindrical portion of the drive capstan.

11. The combination set forth in claim 10 in which the first and second nip-rollers are provided with rubber-like surfaces.

References Cited in the file of this patent

UNITED STATES PATENTS

| | | |
|---|---|---|
| 1,998,931 | Kellogg | Apr. 23, 1935 |
| 2,624,574 | Camras | Jan. 6, 1953 |
| 2,788,209 | Montijo | Apr. 9, 1957 |
| 2,833,538 | Namengi-Katz | May 6, 1958 |
| 2,913,192 | Mullin | Nov. 17, 1959 |
| 2,943,852 | Zuirk | July 5, 1960 |
| 2,959,334 | Uritis | Nov. 8, 1960 |
| 2,990,092 | Begun et al. | June 27, 1961 |